United States Patent [19]
Stamp et al.

[11] Patent Number: 5,194,408
[45] Date of Patent: Mar. 16, 1993

[54] SINTERED CERAMIC MICROWAVE HEATING SUSCEPTOR

[75] Inventors: Jeffrey A. Stamp, Coppell, Tex.; Jeffrey D. Meister, Crystal, Minn.

[73] Assignee: General Mills, Inc., Minneapolis, Minn.

[21] Appl. No.: 766,532

[22] Filed: Sep. 27, 1991

Related U.S. Application Data

[63] Continuation-in-part of Ser. No. 313,930, Feb. 22, 1989.

[51] Int. Cl.⁵ ............................................. C04B 35/52
[52] U.S. Cl. ..................... 501/88; 426/234; 501/87
[58] Field of Search ............... 426/112, 113, 234, 392; 501/97, 98, 88, 87

[56] References Cited

U.S. PATENT DOCUMENTS

| | | | |
|---|---|---|---|
| 4,505,787 | 3/1985 | Fuller et al. | 204/67 |
| 4,825,024 | 4/1987 | Seaborne | 219/10.55 E |
| 4,959,516 | 9/1990 | Tighe et al. | 219/10.55 F |
| 4,970,358 | 11/1990 | Brandberg et al. | 219/10.55 F |
| 5,019,681 | 5/1991 | Lorence et al. | 219/10.55 F |

Primary Examiner—Mark L. Bell
Assistant Examiner—Alan Wright
Attorney, Agent, or Firm—John A. O'Toole

[57] ABSTRACT

Improved ceramic compositions are provided that are useful in the formulation of microwave susceptors as well as the susceptor articles fabricated therefrom. The novel compositions include a binder and a microwave absorbing material of compounds selected from the group consisting of carbides, borides, or nitrides which compositions are sintered at temperatures above about 800° C.

29 Claims, 7 Drawing Sheets

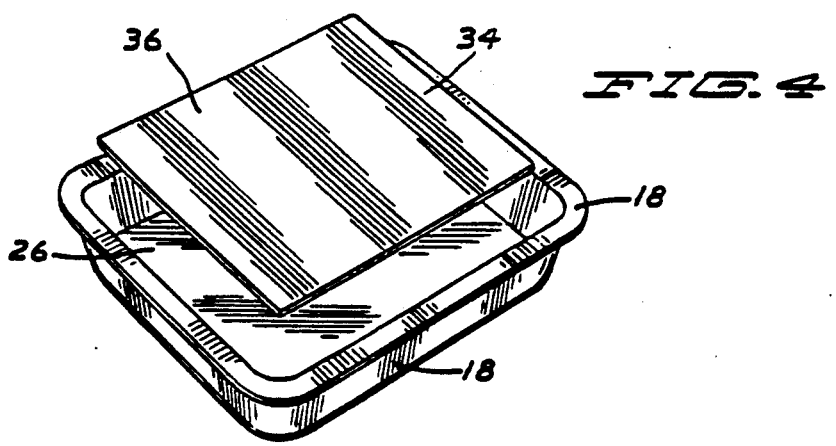
FIG. 4
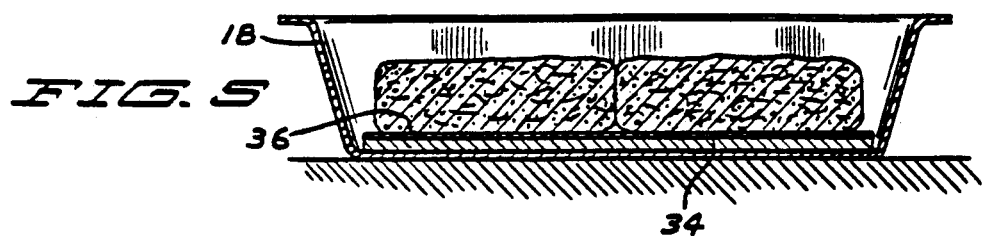
FIG. 5
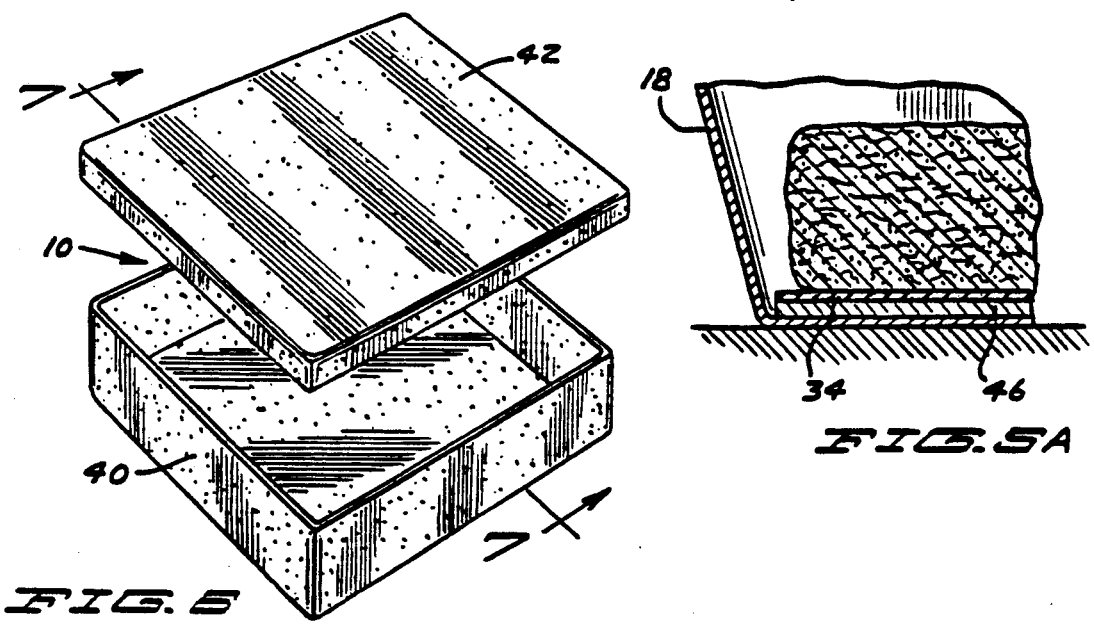
FIG. 5A
FIG. 6
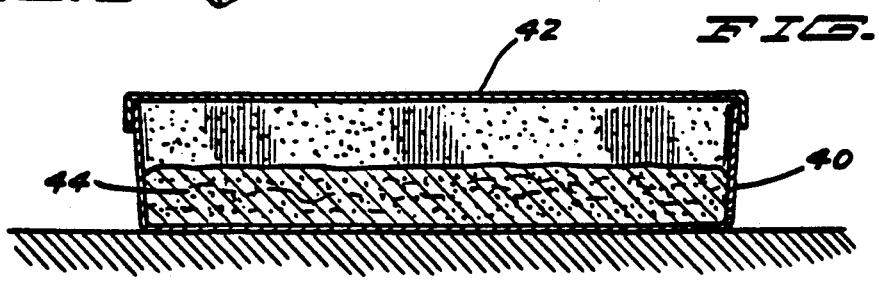
FIG. 7

SINTERED CERAMIC MICROWAVE HEATING SUSCEPTOR

CROSS REFERENCE TO RELATED APPLICATION

This application is a continuation-in-part application to U.S. Ser. No. 313,930, filed Feb. 22, 1989, entitled Improved Ceramic Microwave Heating Susceptor Compositions with Metallized Substrates.

TECHNICAL FIELD

This invention relates to the microwave heating by high frequency electromagnetic radiation or microwave energy and more particularly to novel ceramic compositions, microwave heating susceptors fabricated therefrom and suitable for microwave packages for food products.

BACKGROUND OF THE INVENTION

The art directed towards consumer microwave food packaging has experienced tremendous development in the last several years. While many factors have contributed to the rapid advancement in this art (e.g., increasing penetration of microwave ovens into households, less time available for meal preparation, etc.) perhaps the most significant has been the development of the metallized film microwave susceptor. (See, for example, U.S. Pat. No. 4,267,420 entitled Packaged Food Items and Methods for Achieving Microwave Browning. See also, U.S. Pat. Nos. 4,230,924 and 4,258,086). The metallized film susceptor in simplest form comprises a plastic film substrate and a thin deposited layer of aluminum thereon. The susceptor may additionally comprise a top layer overlaying the aluminum layer for added protection and/or for contact with the surface of a food item to be heated. Due to the thinness of the film and the reduction in structural strength of the plastic film substrate upon heating, the metallized film is conventionally mounted upon a heat resistant paperboard backing support layer.

The prior art includes numerous improvements directed towards modifying and improving one or more performance attributes of the metallized films. The prior art further includes a wide and rapidly growing variety of packaging structures which employ metallized film microwave susceptors as an integral element of the package.

With the development of this technology, microwave packaging has enjoyed a tremendous increase in popularity and usage in view of the performance, convenience, disposability and low cost of metallized film microwave susceptors.

Recently, however, developments have been made by Seaborne in formulating ceramic compositions and fabricating microwave susceptors therefrom for use in consumer microwave packaging. In U.S. Pat. No. 4,810,845 it was found that a wide variety of ceramic materials previously regarded as microwave transparent, were found to be microwave absorbing materials which could be fabricated into susceptors useful in heating devices or utensils. In part, the interest in ceramic microwave susceptors is due to the low cost of these materials which is an especially important consideration in developing disposable food packaging. Also, ceramic materials being common and inert present reduced disposal hazards. Most importantly, metallized film susceptors due to their low mass provide relatively little heat even at higher temperatures. Ceramic susceptors due to their higher mass can provide higher quantities of heat.

Surprisingly, certain specific ceramic materials previously considered to be microwave inert were discovered by Seaborne to absorb microwave energy (at 2450 Hz, i.e., microwave oven frequency) and when fabricated into susceptors could be useful in consumer food package articles for heating/browning foods. Broadly, these ceramic compositions fall into three different categories: ceramic gels, neutral ceramics, and amphoteric ceramics. Microwave ceramic gel susceptor compositions (as well as susceptors and packages comprising these susceptors) are described by Seaborne in commonly assigned U.S. Pat. No. 4,806,718 (see, equivalently, divisional U.S. Pat. No. 4,968,865). Neutral ceramics are in contra distinction to amphoteric ceramic materials. Neutral ceramics are characterized as : having no residual lattice charge. In contrast, amphoteric ceramic materials possess a residual lattice charge.

Useful selected neutral ceramic compositions for consumer microwave susceptor compositions are described by Seaborne in commonly assigned U.S. Pat. No. 4,810,845 (see equivalently, divisional U.S. Pat. No. 4,956,533). In the '845 patent the materials were ceramic materials which were characterized as having a neutral lattice charge and relatively low electrical resistivity. The preferred materials were sodium aluminum silicate clays, sodium metasilicate, kaolin and mixtures thereof. In fabricating the susceptor comprised of the ceramic susceptor material which absorbs energy and a binder, the material must be unvitrified, i.e., not subjected to conventional firing above 800° F.

Useful selected amphoteric ceramic compositions are described by Seaborne in commonly assigned U.S. Pat. No. 4,818,831 (see, equivalently, divisional U.S. Pat. No. 4,965,423). In U.S. Pat. No. 4,818,831 the susceptor compositions also are comprised of a binder and certain ceramic materials in their native and amphoteric forms, as the microwave absorbing material, which ceramic materials are preferably those with residual lattice charges or an unbalance of charge in the framework or layers, such as vermiculite, bentonite, hectorite and selected micas such as Glauconite, Phlogopite, Biotite and mixtures thereof. The ceramics are activated to their amphoteric form by treatment with either acids or bases. Surprisingly, the microwave absorption activity of amphoteric ceramic microwave materials can be augmented by a therein described treatment with acids or bases.

Improvements in these ceramic microwave compositions are described too by Seaborne which additionally comprise selected metal salts as temperature profile moderators. Improved neutral ceramic compositions comprising metal salts are described in commonly assigned U.S. Pat. No. 4,825,024 (see, equivalently, divisional U.S. Pat. No. 4,950,857). Improved amphoteric ceramic compositions containing these selected metal salts are described in commonly assigned U.S. Pat. No. 4,808,780 (see, equivalently, divisional U.S. Pat. No. 4,965,427). Each of these patents are incorporated herein by reference.

Other recent developments in susceptor composition and susceptors fabricated therefrom, to prevent runaway heating, i.e., to provide heat under the influence of microwave radiation up to an upper temperature limit at which the susceptor comes to a steady state absorption of microwave energy and heating to a higher temperature, are found in commonly assigned U.S. Pat. Nos. 4,810,845 and 4,818,831. These patents deal with ceramic microwave heating susceptors.

In U.S. Pat. No. 4,959,516 there is disclosed a susceptor coating comprised of a polymeric binder with a metallic conductive particle and semiconductor particle. The metals may be aluminum, nickel, zinc or copper while the semiconductive particles are selected from carbon black, zinc oxide, titanium carbide and silicon carbide. In preparing the susceptor a dispersion of the particles in the polymeric binder is coated on a substrate and dried.

However, relatively little heat is generated upon microwave heating of such compositions. Also, the mechanical properties of such compositions are deficient. For compositions to be useful from a microwave absorption/heat output standpoint in food heating applications, the concentration of the microwave active materials must be high. However, at such high concentrations of microwave absorbing materials, the compositions lack the machinability or fabrication properties necessary for food packaging uses.

The present invention provides new and improved ceramic microwave susceptor compositions. In part, the improvements reside in new ceramic materials useful as microwave actives in ceramic susceptors. In another aspect, the improvement resides in compositions exhibiting superior mechanical properties which surprisingly nonetheless exhibit useful microwave heating and absorption performance.

The present invention is a further improvement over the articles and compositions of the parent application U.S. Ser. No. 313,930 in terms of mechanical properties of the ceramic and microwave heating performance.

BRIEF DESCRIPTION OF THE DRAWINGS

FIG. 4 is a perspective view of the tray with the food items removed showing a microwave heating susceptor raised above its resting position in the tray;

FIG. 5 is a cross sectional view of the tray taken in the direction of lines 5—5 of FIG. 3;

FIG. 5A is an enlarged cross sectional view partially cut away, comparable to FIG. 5;

FIG. 6 is a perspective view of an alternate tray with a lid each fabricated from the present compositions with food items removed;

FIG. 7 is a perspective view of the alternate tray taken in the direction of lines 7—7 of FIG. 6.

SUMMARY OF THE INVENTION

Figure 1:
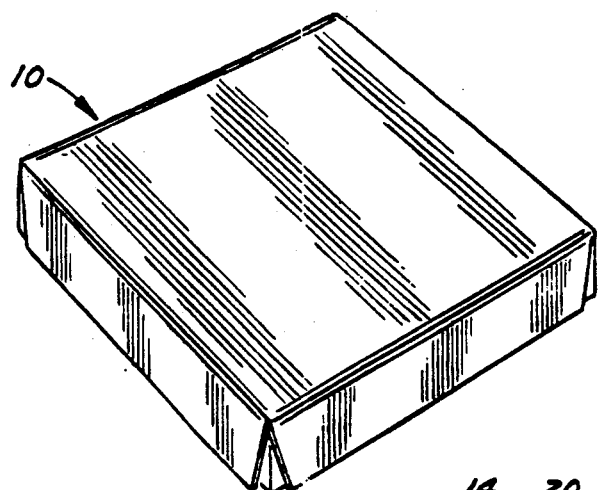
FIG. 1 is a perspective view of a packaged food article for microwave heating.

The present invention provides improved ceramic compositions useful in the formulation and fabrication of microwave heating susceptors. The present compositions essentially comprise a ceramic binder and a microwave active ceramic carbide, nitride, boride or mixture thereof described in more detail hereinafter) which is sintered to a degree suitable as a microwave active susceptor. The compositions when formed into tiles and sintered produce a susceptor of unexpected ability to heat rapidly in a microwave field. The sintered compositions are not readily hygroscopic so that there is no excessive water absorption, which leads to spotting, cracking and loss of heat generation in a microwave field. The sintered products have a relatively high degree of strength, good shelf life, resist moisture absorption and withstand multiple heat cycle applications. Most importantly, sintered compositions comprising the present microwave active materials exhibit heating to a final temperature capable of a close degree of control and thus do not exhibit runaway heating.

The ceramic compositions are sintered at temperatures preferably above about 800° F. (425° C.) to a density below vitrification. A completely vitrified product retains no usefully significant microwave activity. The degree of sintering can be defined in terms of a percentage of theoretical densification as is discussed in more detail below.

In another aspect, the present invention resides in improved microwave susceptors for food packages that are fabricated from the present sintered ceramic compositions.

For the preferred embodiments herein for home microwave food packaging applications, the sintered microwave heating susceptors generally are in a sheet or tile form preferably ranging in thickness from about 0.05 to 8 mm. The heating susceptor may, however, be in the form of a tray or container, with or without a lid or cover as exemplified in the drawings. Of course, microwave heating widely in shape and size.

In the present ceramic compositions and susceptors fabricated therefrom, the ceramic carbide, nitride, or boride may be the sole microwave active material or may be employed in combination with the materials described in U.S. Pat. Nos. 4,818,831 and 4,810,845 discussed above, whether as supplemental microwave actives or as binders. Thus, the present microwave absorbing ingredients can be employed in combination with other microwave absorbing materials such as ceramics with neutral lattice charges such as clays, kaolin, talc silicates, alumina, aluminasilicates, or mixtures thereof or in combination with amphoteric ceramics which in their native form have a residual lattice charge or an unbalanced charge in the fundamental layers or framework such as vermiculite, bentonite, hectorite and micas, which may be activated to their amphoteric form by treatment with acids or bases.

DETAILED DESCRIPTION OF THE INVENTION

The present invention accordingly relates to improved ceramic microwave susceptor compositions essentially comprising certain microwave absorbing materials and a binder sintered to controlled degrees of densification. Each of these composition components as well as product preparation are described in detail below. Throughout the specification and claims, percentages are by weight and temperatures in degrees Fahrenheit unless otherwise indicated.

In the ceramic industry, a distinction is made between "greenware" a ceramic composition before firing, and a finished, fired, ceramic composition. The firing step profoundly changes a large number of properties of the ceramic composition as the individual constituents are fused into an homogeneous state. In ceramic ware, the greenware is fired at temperatures and times to effect vitrification, i.e., to a density of 95% of theoretical.

The present ceramic compositions are importantly characterized by a particular degree of sintering. The present compositions importantly are sintered (i.e., heated to become a coherent mass by heating without melting) at a temperature above about 800° F. (425° C.) to a density below vitrification, i.e., a density of about 50% to 90% of the theoretical density that the composition may reach. A fully fired ceramic, in the ceramic industry, is greater than about 95% of the theoretical density.

In U.S. Pat. Nos. 4,810,845 and 4,818,831, discussed earlier, the ceramic microwave active compositions greenware employed therein and susceptors fabricated therefrom, are unvitrified, i.e., not subjected to a conventional firing operation above 800° to 2000° F. Conventional firing is therein taught to be avoided so as to avoid any fused ceramic composition which would be substantially transparent to a microwave and accordingly devoid of desirable microwave reactive properties. Indeed, even a modest heating treatment markedly undesirably reduces their microwave heating performance. In contrast thereto, the present compositions are desirably sintered to a controlled degree thus providing a densification to about 50% to 90% of theoretical. Densification is achieved by heating the composition to a temperature above about 800° F. for a time sufficient to increase the density to within the ranges specified herein but below vitrification to a fused homogeneous mass as in making ceramic ware. Unexpectedly, in view of the teachings of U.S. Pat. Nos. 4,810,845 and 4,818,831, the compositions sintered in accordance with the present invention are not transparent to microwave energy but possess desirable microwave active or absorbing properties and greatly improved mechanical properties and resistance to moisture absorption.

The microwave active, or microwave absorbing material of the present compositions, and susceptors fabricated therefrom, are selected ceramic compounds selected from the group consisting of carbides, nitrides, borides and mixtures thereof. The preferred compounds are the carbides, particularly silicon and titanium carbide. Other carbides useful in the present invention are metallic (interstitial) carbides such as zirconium carbide, hafnium carbide, vanadium carbide, tantalum carbide, molybdenim carbide and niobium carbide. Covalent carbides are especially preferred and can include silicon carbide, boron carbide and graphite. Nonmetal binary covalent borides and nitrides are silicon boride, silicon nitride and boron nitride. Also suitable for use herein are metallic, binary interstitial borides and nitrides, such as titanium boride, titanium nitride, zirconium boride and zirconium nitride. Calcium boride, an ionic binary semiconductor, however, is not suitable, being unstable, potentially explosive, when mixed with water. The silicon compounds, carbide, boride or nitride are preferred from the overall property standpoint.

The present compositions include an amount of the above-described microwave absorbing materials effective to heat a food product in contact therewith when heated in a microwave oven. The precise level will depend on a variety of factors including end use application, active material(s) selected, desired final temperature, and thickness of the susceptor device. Good results are generally obtained when the microwave absorbing material(s) comprises from about 15% to about 98% by weight of the present ceramic compositions. Preferred compounds include from about 20% to 95% by weight of the microwave absorbing material. For best results, the ceramic compositions comprise about 30% to 95% by weight of the microwave absorbing materials. The particle size of the microwave absorption material or refractory is not critical. However, finely ground materials (through No. 70 mesh screens U.S. Standard or less than 200 micron diameter) are preferred inasmuch as the ceramic susceptors produced therefrom are smooth and uniform in texture.

Useful herein as the essential binder component are any sinterable binder materials for ceramic materials. The sinterable binders which are employed preferably are ceramic binders, i.e., those which are ceramic in nature, although sinterable non-ceramic binders may be employed also. Thus, the binder must be sinterable when employed in the mixture with the microwave active materials described above, either carbide, nitride, or boride. (The preferred binders are accordingly materials such as clays, hectorite, bentonite, montmoullonites, attapulgite, vermiculite, sepiolite, saponite, koolinite, illite, halloysite), talcs, micas, and non-siliceous ceramics. It will be recognized that many of these materials employed as binders herein are those which, when employed in U.S. Pat. Nos. 4,810,845 and 4,818,831, comprise the microwave active material in those patents. In the present invention those materials when employed as a binder may also possess some microwave active or absorbing properties, although as noted in the patents, heating above 800°–1000° F. rendered such materials devoid of microwave reactive properties, and the present invention sinters the composition at temperatures above these. Accordingly, in the present invention the materials are used substantially for their binder properties in the sintered product rather however, that these binders in the sintered products may retain some residual microwave active properties when employed with the ceramic carbide, nitride or boride compounds.

The present ceramic compositions desirably contain sufficient amounts of the binder to bind the present primary microwave actives together with any supplemental microwave actives and optional materials into a finished product of useful mechanical strength upon sintering. The binder desirably comprises from about 5% to 80% of the present compositions. Better results in terms of microwave performance and product mechanical properties are obtained when the binder comprises about 5% to 80% and for best results about 5% to 70%.

Another optional material which can be included to vary the microwave absorbing properties, i.e., as a supplemental microwave active component, is the metallic coated particles disclosed as useful microwave active materials by Seaborne et al. in U.S. Ser. No. 313,930, entitled Improved Ceramic Microwave Heating Susceptor Compositions with Metallized Substrates. The supplemental microwave active can comprise about 0.1% to 25%.

Also, colorants can be incorporated at appropriate levels. Any optional ingredients employed must be sinterable and must not adversely affect the microwave energy absorption properties of the ceramic microwave active compounds. If present, each of these minor adjuvant materials can comprise about 0.01% to about 5% of the present compositions.

While not wishing to be bound by the proposed theory, it is speculated herein that a ceramic upon substantially complete vitrification has an internal molecular structure which is relatively immobile and thus not capable of resonating when exposed to an applied electrical field. This inability to resonate is due to the internal molecular networks of vitrified ceramics being fused. Since the fused networks cannot resonate, the materials are transparent to the applied electrical field and therefore are transparent thereto. In contrast, the present densified ceramics have an internal lattice structure which while partially fused nonetheless are tuned to or are allowed to resonate or absorb microwave energy and convert the absorbed energy into infrared heat.

It is further speculated herein that the present densified compositions can also be distinguished from amphoteric microwave susceptor materials in the mechanism of absorption. Amphoteric materials in an activated (i.e., acidified or alkalinized) possess ions within a relatively inert lattice structure which are free to resonate and thus absorb and convert microwave energy to heat. In contrast, in the present compositions, it is believed that in addition to the mechanism of microwave absorption and heat generation of the previous references, the present composition additionally involves the mechanism of lattice deformation causing in turn, internal frictional heating and thus infrared heat generation.

METHOD OF FABRICATION

The ceramic composition of the present invention can be fabricated into useful articles by common ceramic fabrication techniques including both extrusion and slip-casting. Generally, the materials of the composition are admixed into an homogeneous blend employing water in sufficient amounts for those binders requiring water and to form the composition into a workable mass to fabricate it into the desired shape, size and thickness. Typically, the water employed will be in an amount of about 0.1% to 50% of the total composition by weight, and generally less than 10% to 20%. While the mixture is soft and workable, it is fabricated into the desired shape, etc.

The mixture is then dried (to less than about 5% free water) at temperatures up to 250° F. after which the dried piece is then heated at 800° F. or above to a sintering temperature for a time sufficient to increase the density of the product. Sintering temperatures up to about 1700° F. may be generally employed. At these temperatures, the degree of sintering desired is achieved within a relatively short time, i.e., 5–30 minutes dependent on the temperature and size of the article into which the composition is shaped. In a microwave heating susceptor in sheet or tile form of about 4–5 inches on a side and a thickness of about 0.1 inch sintering at 1200° F. at about 10 minutes is desirable. Sintering temperatures above 1000° F. to about 1500° F. are preferred. Such temperatures for the time periods discussed above will provide the usual shaped susceptors to a density degree of about 50% to 90% of the theoretical density, preferably about 50% to 80% and below vitrification which is a degree of density of greater than about 95% of theoretical. For reasons not understood, sintering at temperatures above 1800° F. (1000° C.) can result in finished ceramics which no longer heat by the mechanisms of dielectric heating and/or lattice deformation, but by a semiconductor mechanism that can undesirably result in runaway heating.

The final heating temperature of the present susceptor articles is influenced in part by the thickness of the articles fabricated. Susceptors in the form of sheets, disks or tiles having thicknesses of about 0.4–8 mm in thickness, preferably 0.7 to 4 mm, provide good results in practical application for cooking of foods.

Upon heating in a conventional microwave oven, e.g., 2450 MHz, the present sintered ceramic compositions will relatively quickly (e.g., within 30 to 300 seconds) heat to a final temperature ranging from about 300° to 800° F. which temperature range is very desirable in providing crisping, browning to foods adjacent thereto and consistent with safe operation of the microwave oven.

A surprising advantage of the present compositions is that unlike ferromagnetic bulk microwave active materials or even certain unsintered compositions herein, the present compositions do not exhibit runaway heating rapidly to excessively high temperatures (e.g., the Curie temperature for ferromagnetic materials). Also, the temperature heating profile including the final temperature can be controlled quite closely by formulation, sintering times and temperatures.

In one embodiment it is important that the covalent carbides be evenly distributed throughout the ceramic composition so that the microwave energy filtering is uniform, i.e., the ceramic compositions are homogeneous. In another embodiment, however, the covalent carbides can disproportionally occur in a layer or region within the susceptor, i.e., the compositions are heterogeneous. This is especially useful when trays are fabricated to hold and heat two or more different foods.

As noted above, one highly desirable benefit resulting from the formulation of microwave susceptor compositions which include covalent carbides is that the addition of the covalent carbides provides a substantial temperature boost to the final operating temperature reached by the ceramic composition. In addition to giving a temperature boost, or when ceramic compositions are formulated so as to have a controlled final operating temperature, these ceramic compositions containing covalent carbides provide additional heat generation even at such controlled temperatures, i.e., generate more heat/calories even while at a given temperature (i.e., converting the microwaves to a broader band of IR radiation).

This feature is useful, for example, in certain consumer food package applications, e.g., frozen, battered, par-fried fish portions, for provision of a superior product upon microwave heating, wherein it may be desirable to control the absorption of microwave energy by the fish portion to a fairly narrow range, e.g., 30% to 45% of the microwave energy. If excessive microwave absorption by the fish portions occurs, the fish portions are overcooked and become dry and tough. Insufficient microwave absorption, however, can result in interior portions of the fish portions being soft and/or cold. The present compositions with covalent carbides enable the provision of the microwave susceptor specifically tailored for such food items with respect to operating temperature, transmissivity and heat generation.

One advantage of the present invention is that upon heating in a conventional microwave oven, e.g., 2450 MHz, the ceramic compositions will relatively quickly (e.g., within 30 to 300 seconds) heat to a final temperature ranging from about 300° to about 700° F. (150° to 315° C.) which temperature range is very desirable in providing crisping and browning to foods adjacent thereto and consistent with the safe operation of the microwave oven. It is believed that all microwave susceptors work by absorbing microwave radiation and releasing energy as conductive heat or as low wave length infrared radiation. An added advantage of the present susceptors is the additional heat generation even at equivalent operating temperatures compared to metallized film disposable susceptors. This is due in part to the additional mass of the present susceptors. Additionally, metallized susceptors, it is believed, after quickly reaching a maximum temperature rapidly begin to deteriorate and fail and thus drop-off in conversion of microwave energy to sensible heat.

Still another advantage of the present ceramic compositions is that they are believed to be useful not only with microwave ovens operating at 2450 MHz (2.54 GHz) but at all microwave frequencies, i.e., above as low as 300 MHz or even at higher frequencies or 100 GHz.

Still another advantage is that the present compositions can be used with microwave ovens having a wide range of power capacities, e.g., 200 to 2,000 watts. In contrast, metallized film microwave susceptors often fail to generate desirable temperatures when used in low power microwave ovens, e.g., <500 watts.

The present microwave susceptor compositions are useful in any number of microwave absorption applications. The present compositions are particularly useful for fabrication into microwave susceptors which in turn are useful as components in packages for foods to be heated with microwaves for distribution and sale in room temperature, refrigerated or frozen display cases. As an alternate utility, the present compositions can be fabricated into inexpensive or disposable microwave susceptor surgical implants which absorb microwave radiation to treat tumors thermally or into consumer appliances such as hair curlers, or for industrial applications such as driers or heaters.

Other types of packages can be utilized with the improved microwave susceptor compositions of the present invention. It is an important advantage that the present compositions can be fabricated into susceptors of different configurations whether regular, e.g., square, oval, triangular or even corrugated, or irregular. For example, smaller disks of the present compositions can be used in substitution for metallized films in the popular bag packages for microwave popcorn.

The susceptor compositions of the present invention can also be utilized in non-disposable utensils adapted for repetitive heating cycles by embedding the susceptor or otherwise associating the heater with a non-disposable utensil body. The susceptor is associated with the remainder of the utensil in a manner such that the heater will be in heat transfer relation to a product to be heated in or on the utensil. The utensil can be in the form of an open top dish, griddle or the like.

The present ceramic compositions are useful in any number of microwave absorption applications. The present ceramic compositions are particularly useful for fabrication into microwave susceptors which in turn are useful as components in packages for foods to be heated with microwaves. These can be seen by reference to the FIGS. 1-7.

Figure 2:
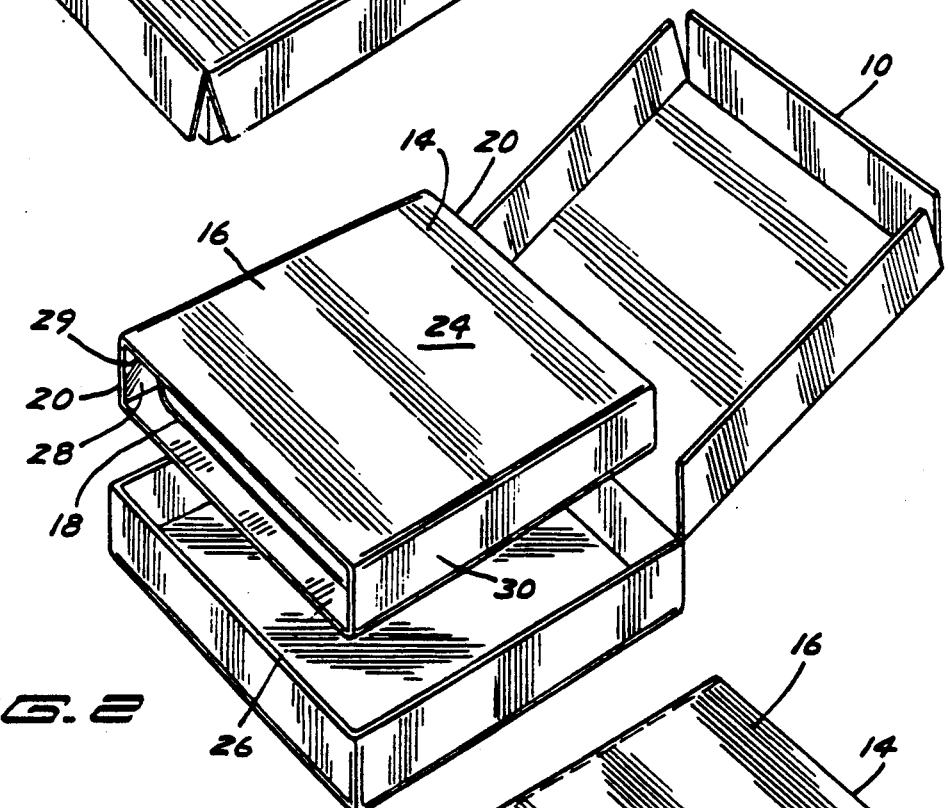
FIG. 2 is a perspective view of the packaged food article with outer paperboard outerwrap opened and with an inner tray and sleeve shown disengaged.

For example, FIG. 1 illustrates generally a packaged food item 10 fabricated in accordance with the teachings of the present invention and suitable for microwave heating. FIG. 2 shows that the article 10 can optionally comprise a six-sided outerwrap 12 which can be plastic, e.g., shrink wrap, paper or other conventional packaging material such as the paperboard package depicted. The article can further comprise an inner assembly 14 disposed within the outerwrap 12 which can comprise a sleeve 16 fabricated from a dielectric material and disposed therein a tray 18. In conventional use, the consumer will open the article 10, remove and discard the overwrap 12, and insert the entire assembly into the microwave oven. The sleeve 16 is helpful although not essential not only to prevent splattering in the microwave oven, but also to assist in securing the food items against excessive movement during distribution.

Figure 3:
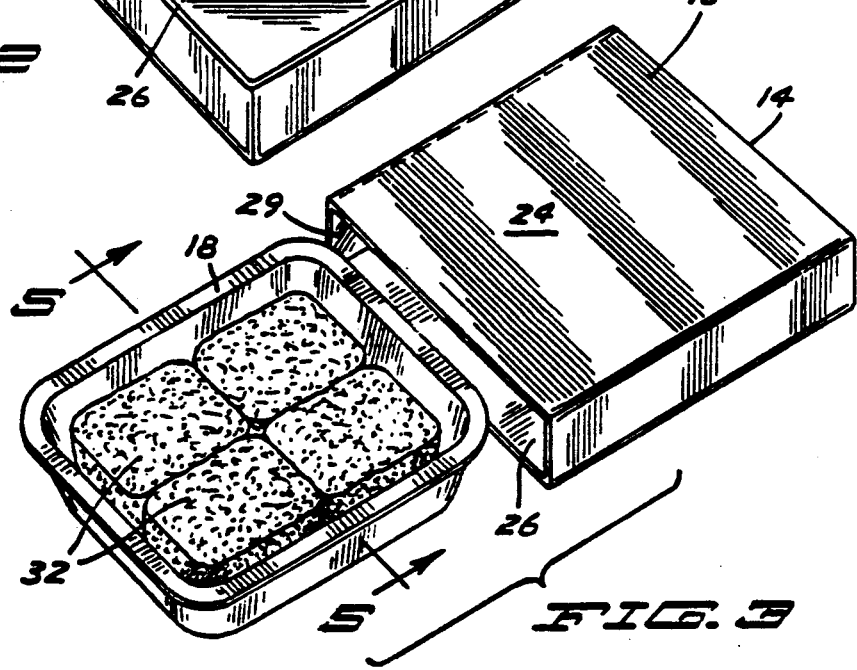
FIG. 3 is a perspective view of the tray disengaged from the sleeve and holding several food pieces.

In FIG. 2, it can be seen that the sleeve 16 can comprise an opposed pair of open ends, 20 and 22, an upper bottom wall 26 and an opposed pair of minor side or wall major surface or top wall 24, a lower major surface or surfaces 28 and 30. As can be seen in FIG. 3, the tray 18 holds or contains one or more food items 32. FIG. 4 shows the tray 18 with the food items 32 removed. Disposed within the tray 18 is one or more microwave heating susceptors such as microwave susceptor heating panel 34. In this preferred embodiment, the susceptors are generally flat or planar and range in thickness from 0.020 to 0.250 inch.

Still referring to FIGS. 3 and 4, with the cooking of certain foods, it may be desirable to heat the food items 32 from only or primarily one side by use of the heating susceptor panel 34 while at the same time minimizing the heating of food item 32 by exposing it to microwave radiation through the walls of the package assembly 14. To allow microwave radiation to reach the susceptor 34, the bottom wall 26 is microwave transparent at least to the extent that sufficient microwave energy can enter the package to heat the susceptor 34. Side walls 28 and 30 can each optionally be shielded with shielding 29 as can top wall 24 thereby restricting the entry of microwave radiation through these walls to the food product as is known in the art. The shielding 29 can be of any suitable type material of which aluminum foil is a currently preferred material. With the use of shielding, the microwave radiation penetrates the microwave transparent bottom 26 only. Accordingly, cooking of the food product 32 in this embodiment is accomplished substantially totally by the heat transferred to the food product 32 from the susceptor 34 although some microwave entry through the open ends 20 and 22 occurs. It is pointed out that the terms microwave transparent and microwave shield are relative terms as used herein and in the appended claims.

In FIG. 5, it can be seen that the heating panel 34 can optionally comprise a thin finish layer 36, e.g., 0.00005 to 0.001 inch (0.001 to 0.025 mm) to impart desirable surface properties, e.g., color, water repellency, smooth appearance, stick free, etc. In the simplest form, such a layer can comprise ordinary paraffin or a sodium silicate polymerized with zinc oxide. The finish layer does not substantially adversely affect the performance of the microwave susceptor. Such surface property modification finds particular usefulness when the microwave susceptors are used in medical settings. For example, it is known to fabricate surgical implants, e.g., disks, cylinders, from ferrites which absorb microwave radiation to thermally treat tumors. In such applications wherein the present compositions are employed, water repellency may be particularly desirable. In food applications such surface coatings are useful to forestall completely migration from susceptor to food.

Other types of packages can be utilized with the ceramic microwave heater compositions of the present invention. It is an important advantage that the present compositions can be fabricated into susceptors of different configurations whether regular, e.g., corrugated, or irregular.

Another embodiment is depicted in FIGS. 6 and 7. In this embodiment, the article 10 in addition to outerwrap 12 as shown in FIG. 2 can comprise a microwave heating susceptor 40 fabricated into trays or shallow pans whether square, rectangular, circular, oval, etc. which serve both to contain and heat the food items. Such tray shaped susceptors 40 find particular suitability for use in connection with a batter type food item 44, especially cake batters or with casseroles, baked beans, scalloped potatoes, etc. In one particular embodiment the tray 40 can additionally include a cover 42 also fabricated from the present ceramic compositions. Trays 40 with covers 42 are which it is desired to form an upper or top skin to the food especially useful for batter food items like brownies in item 44.

The invention can be further illustrated, but not limited, by the following examples.

EXAMPLE 1

This example compares the effect of sintering upon certain ceramic microwave susceptor compositions and the improved ceramic microwave susceptor compositions of the present invention.

A ceramic composition, Sample 1, containing an amphoteric ceramic material described in U.S. Pat. No. 4,818,831, having the following composition was prepared:

|  | Sample #1 |
| --- | --- |
| "Pre-active" vermiculite[1] | 42 |
| Hectorite (binder) | 58 |

[1]A mixture of crude and exfoliated vermiculite (an amphoteric microwave susceptor material having been activated to its amphoteric state by an acid wash.

The materials were combined with about 10% water (as a processing aid) and pressed into 20 gram disks, (3" in diameter × ~0.080" thick). The disks were dried to remove the added water.

For comparison, like sized and prepared disks fabricated from compositions of the present invention were made.

|  | Sample #2 | Sample #3 |
| --- | --- | --- |
| Silicon carbide | 20 | 80 |
| Hectorite (binder) | 80 | 20 |

Sintered samples of each of the three formulations were prepared by heating at 1200° F. for 10 minutes. These were then compared to the same formulations in the greenware state.

The microwave absorption characteristics were determined by measuring the change in temperature of the disks when exposed to microwave power over time. A Gerling Laboratories, 700 watt, 2450 MHz, microwave oven was used. This oven was selected since it is designed for laboratory use and has the capability of controlling power output, duty cycles, etc. Temperature data acquisition was accomplished using a Luxtron fluoroptic thermometry system. Fluoroptics allows the researcher to measure temperature changes within an electro-magnetic field without interference. Data collection was discontinued at temperatures about over 600° F. due to the maximum temperature tolerated by the measurement probe without damage.

Figure 8:
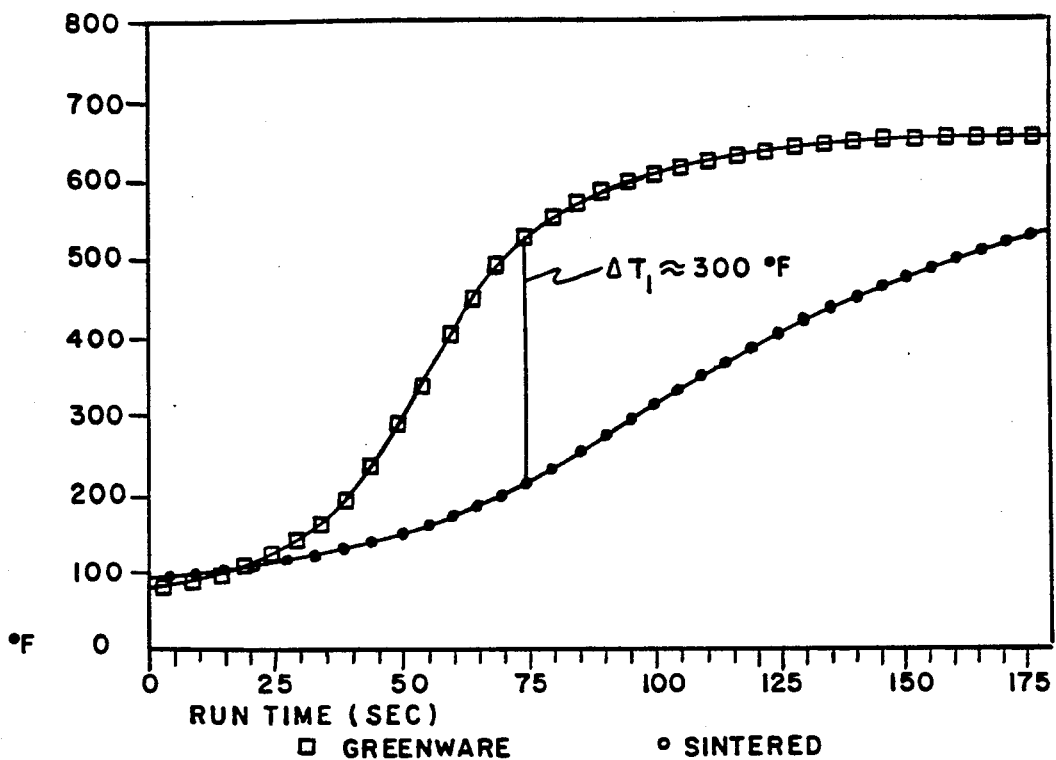
FIGS. 8–16 depict time/temperature response curves for ceramic compositions exemplified in Examples 1–3.
Figure 9:
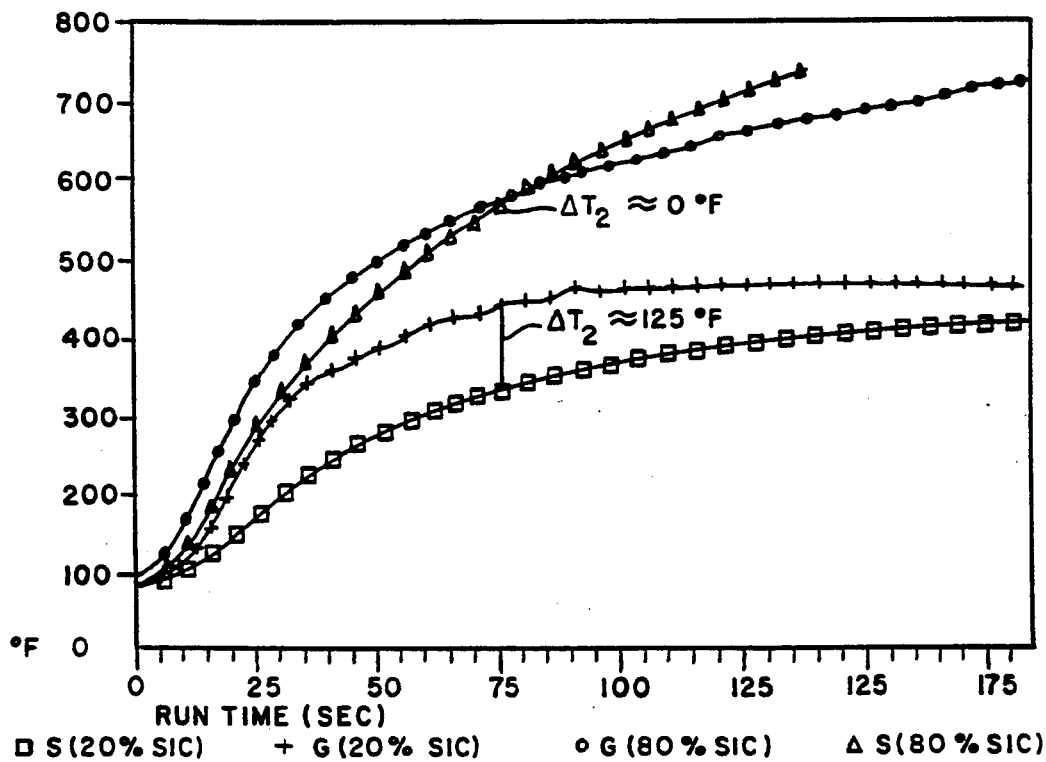

Results of the temperature testing, at 700 watts, are given in FIGS. 8 and 9 as temperature profile curves vs. time.

In FIG. 8, the temperature profile for the greenware and sintered material (Sample 1) is shown. Sample 1 is an amphoteric ceramic microwave susceptor composition described in U.S. Pat. No. 4,818,831, entitled Amphoteric Ceramic Microwave Heating Susceptor. Each sample is measured without a water load (simulating a foodstuff) and thus shows the heating performance of the materials alone when exposed to microwave energy.

In FIG. 8, it can be seen that, as expected, the greenware amphoteric ceramic material heats well and reaches an approximate final temperature of about 600° F. However, the sintered amphoteric material exhibits a substantial diminution in temperature obtained under comparable conditions. For example, the temperature difference ("$\Delta T_1$") at 75 seconds for Sample 1 is about 300° F. (The subscript indicates the sample or experiment number).

In FIG. 9, it can be seen that Sample 2 of the present invention similarly heated also exhibits in a greenware state a higher temperature than in the sintered state. However, the temperature difference at 75 seconds ("$\Delta T_2$") for Sample 2 is unexpectedly much smaller. At higher concentrations of the present microwave active of preferred embodiments herein, namely at 80% SiC as in Sample 3, the temperature differential between the greenware and sintered ceramic at 75 seconds ("$\Delta T_3$") is approximately 0° F.

The results of this testing illustrate that while the sintered ceramic compositions of the present invention exhibit some diminution in heating performance upon exposure to a microwave field compared to a greenware state, that the diminution is unexpectedly smaller than for other ceramic microwave susceptor compositions. Moreover, at higher preferred microwave active concentrations, the diminution upon sintering of the present compositions is quite low.

Figure 10:
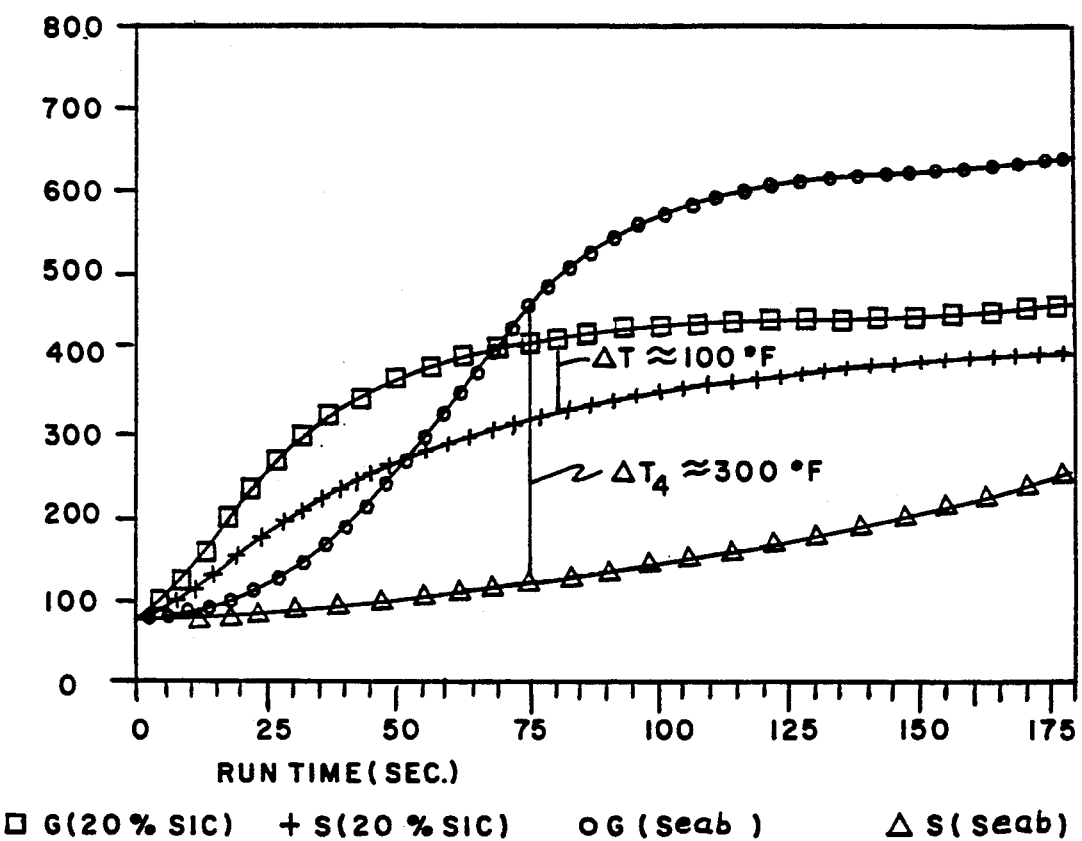

Sample 1 and Sample 2 were further tested to measure the temperature upon microwave heating when subjected to a water load. In this experiment, 500 g of water in a Pyrex beaker #20 is in a proximate position but with no actual physical contact. The water load simulates a foodstuff which competes with the microwave susceptor for microwave energy. The results of this testing is given in FIG. 10. In FIG. 10, the greenware amphoteric ceramic and the sintered amphoteric ceramic are compared (Sample 1). At, for example, 75 seconds, the temperature differential ("$\Delta T_4$") is about 370° F. This temperature differential is greater than the $\Delta T_1$ of 300° F. shown in FIG. 8. This testing suggests that the effect of sintering upon an amphoteric microwave ceramic composition is even worse when the ceramic composition is heated with microwaves with a food load as simulated by a 500 g water load. Also shown is the Sample 2 which under comparable conditions (i.e., a 500 g water load) the temperature differential between the greenware and sintered samples ("$\Delta T_5$") is only about 100° F. This illustrates that in contrast the temperature diminution aggravated by the presence of a competing food load.

EXAMPLE 2

This example shows the performance of a microwave susceptor composition of the present invention. In this example the microwave active includes the combination of a carbide and a metallized substrate such as nickel coated mica. The example also compares the affect of sintering upon this composition.

The composition of the present invention was prepared having the following formulation:

| Ingredient | Weight % |
| --- | --- |
| Nickelized mica | 20.0 |
| Silicon carbide | 20.0 |
| Hectorite (binder) | 60.0 |

The nickelized mica comprised a mica substrate coated with a 65% by weight nickel coating.

The above composition was fabricated into sample disks in a manner comparable to the process described in Example 1. The sample was designated Sample 7.

For comparison purposes, a similar ceramic microwave susceptor composition not of the present invention was prepared having the following formulation:

| Ingredient | Weight % |
| --- | --- |
| Nickel mica | 20.0 |
| Blend of Hectorite and Bentonite | 60.0 |
| Vermiculite (active) | 20.0 |

This formulation was formed into a sample disk according to the procedure of Example 1 and was designated Sample 6.

Disks comprising the Sample 6 formulation and Sample 7 formulation were then sintered at 1200° F. for 10 minutes to form sintered ceramic compositions. Thereafter, both the greenware and sintered samples were tested for microwave absorptivity but with a 500 g water load accompanying, but not in contact with. The results of such testing are given in FIGS. 11 and 12.

Figure 11:
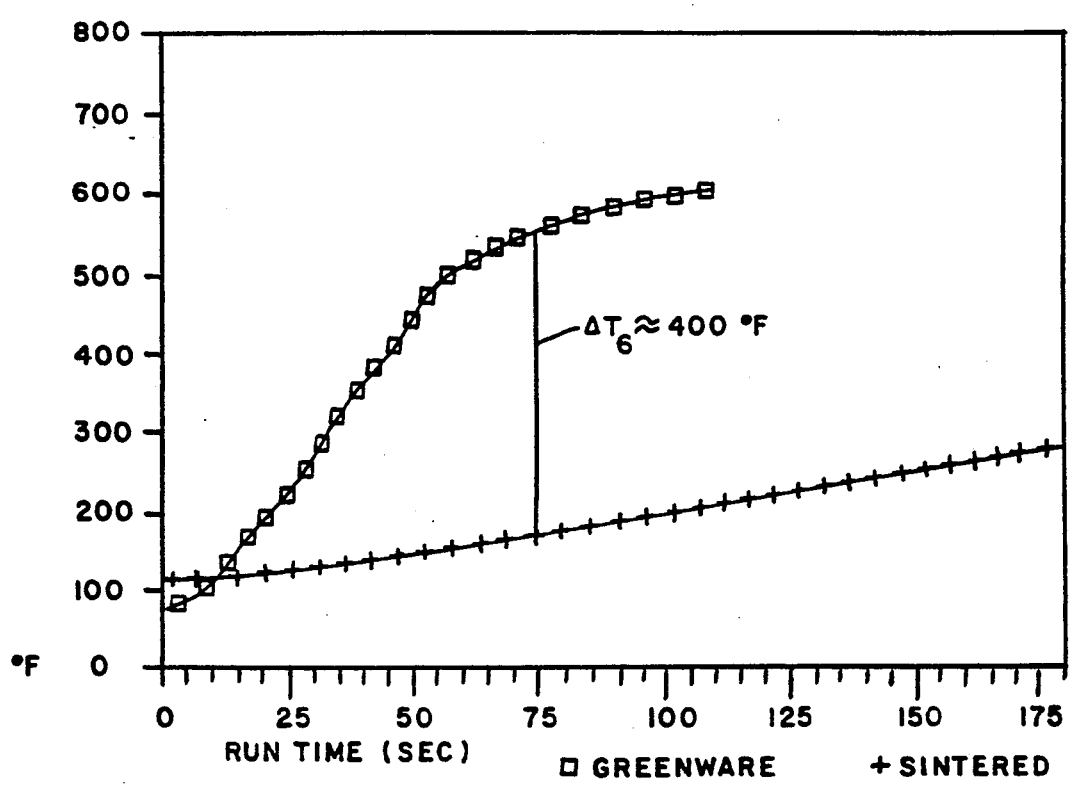
Figure 12:
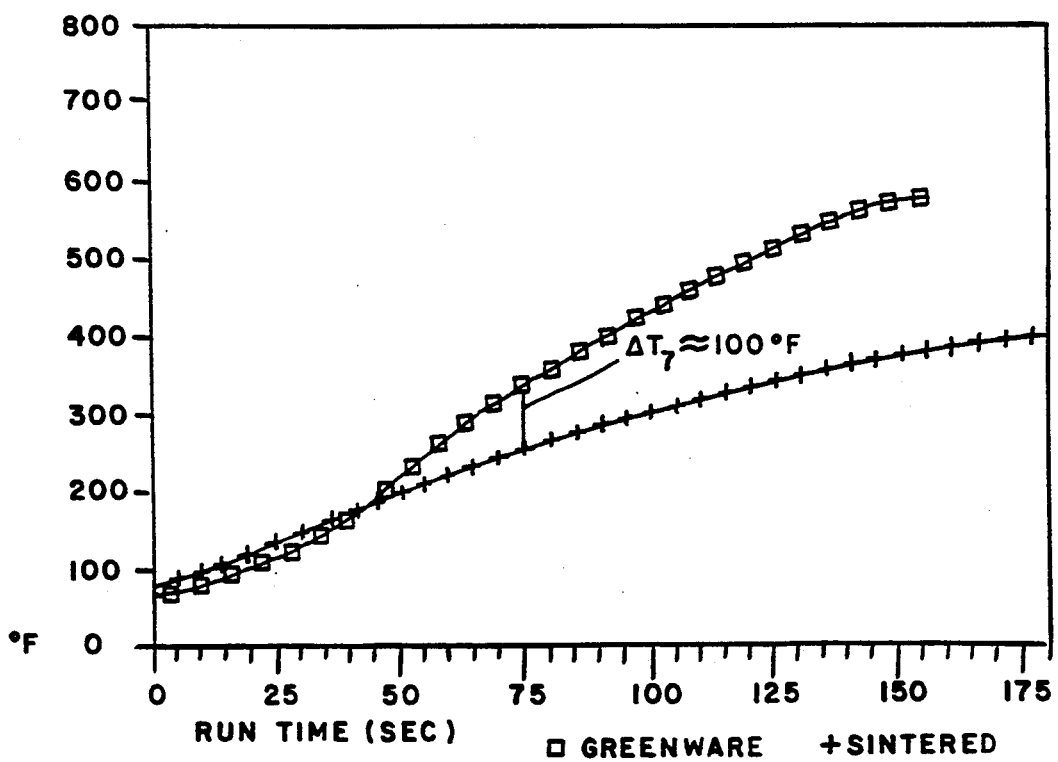

In FIG. 11 the sintered and unsintered Sample 6 composition temperature profiles are depicted. In FIG. 11 it can be seen that the sintered product with a competing water load exhibits a very substantial temperature difference compared to the unsintered or greenware composition when heated also with a water load. For example, at 75 seconds the difference in temperature ("$\Delta T_6$") is about 400° F.

The temperature profiles for the Sample 7 composition of the present invention for both sintered and unsintered show dramatically different results. That is, the temperature difference at, for example, 75 seconds, ("$\Delta T_7$") is only about 100° F. This data demonstrates that sintering the present ceramic composition has a marketedly lower diminution in heating performance when heating under a water load compared to the unsintered or greenware product. This testing shows the unexpected superiority of ceramic compositions of the present invention when sintered compared to similar compositions not of the present invention.

Compositions of comparable microwave absorbing characteristics are obtained when in the Sample 7 composition the silicon carbide is substituted with an equivalent amount of $Mo_2C$, $B_4C$, TiC, HfC, and mixtures thereof.

EXAMPLE 3

This example shows the flexibility and degree of control over temperatures obtained upon microwave heating by controlling the conditions of both sintering temperature and time.

In the first part of this example, the ceramic compositions of the present invention are sintered at lower temperatures for variable times.

A composition of the present invention was prepared having the following formulation:

| Ingredient | Weight % |
| --- | --- |
| Vermiculite[1] | 20.0 |
| Silicon carbide | 20.0 |
| Nickelized mica[2] | 10.0 |
| Hectorite | 50.0 |
| | 100.0% |

[1]An amphoteric ceramic microwave active having been activated to an amphoteric state to enhance its microwave absorptivity by having been soaked in a 0.36 N NaOH solution for three hours and dried.
[2]A nickelized mica having a nickel coating of 65% by weight.

Sample disks of the above formulation of the present invention were prepared as described in Example 1 except that in this sample the water processing aid of Example 1 was substituted by a like amount (apx. 10% by weight) of a 0.36 N NaOH solution. Upon fabrication into disks the added moisture was removed by drying.

The composition so prepared can be characterized as an improved ceramic microwave susceptor composition of the present invention comprising a silicon carbide as a primary microwave absorber with two supplemental microwave absorbing components, namely, the nickelized mica and an amphoteric microwave absorbing composition having been activated to its amphoteric form.

Sample disks were then sintered at 800° F. for varying periods, namely, one minute, 10 minutes and 30 minutes.

Figure 13:
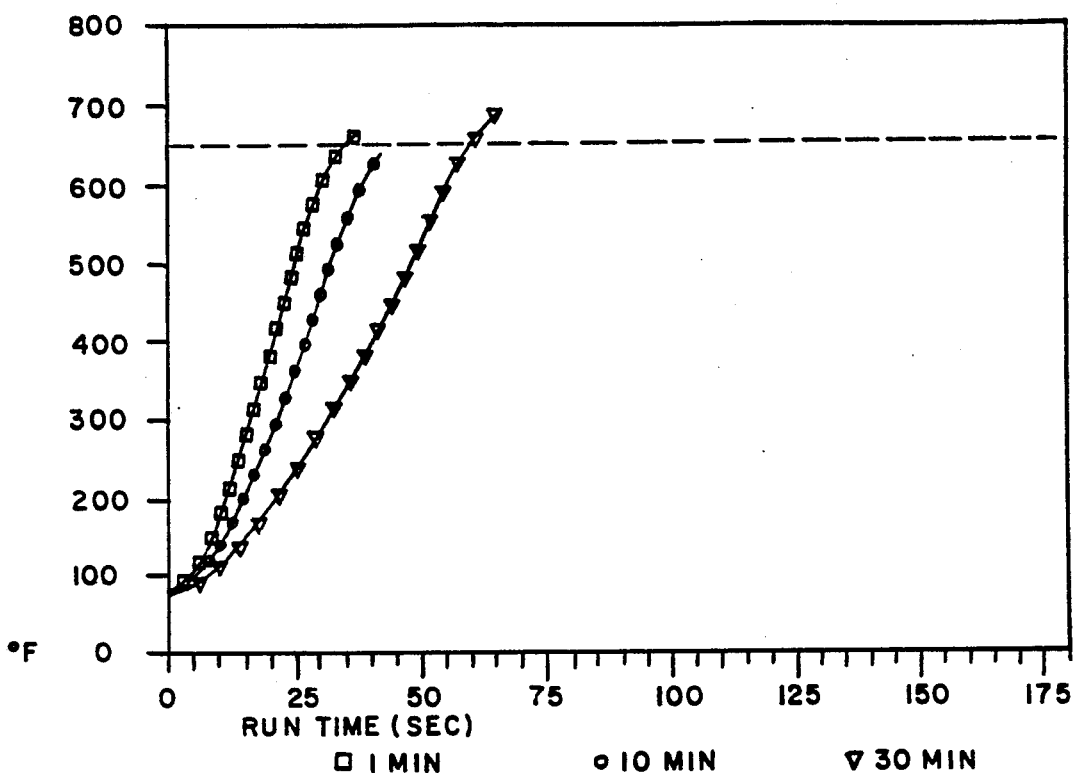

The disks were then heated separately in a microwave oven at 700 watts without a competing water load. The results of such testing are depicted in FIG. 13. Again, when the disks reached around 600° F., the heating was discontinued and temperature data gathering terminated.

The result depicted in FIG. 13 shows that the rate of temperature increase and temperatures obtained can be controlled by controlling the duration of the sintering operation.

Figure 14:
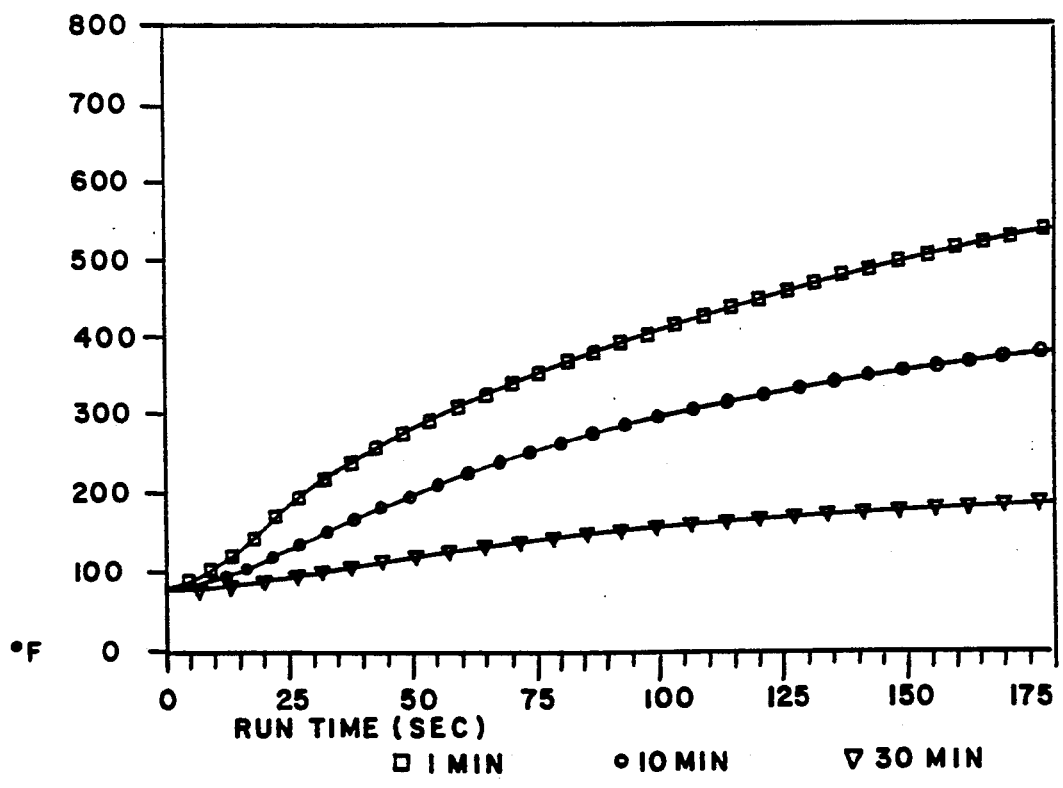
Figure 15:
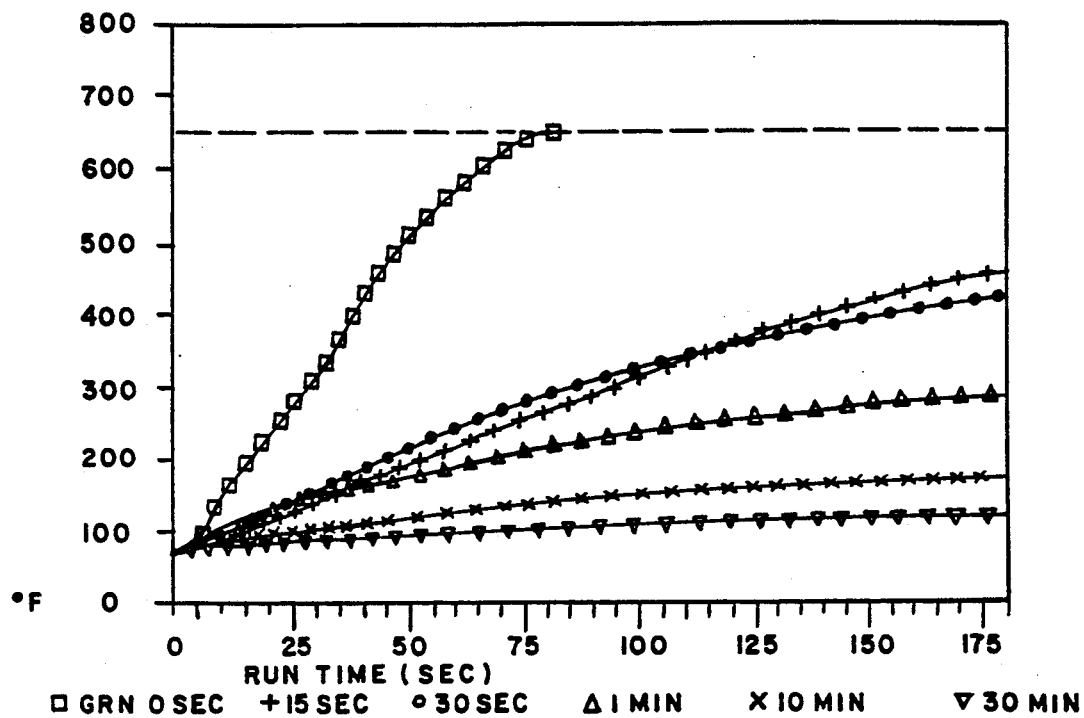

In a similar experiment, similar disks were prepared but sintered at 1700° F. for varying periods; namely, 1, 10 and 30 minutes. The sintered sampled disks were then each separately heated in a microwave oven at 700 watts without a water load. The results of such testing are depicted in FIG. 14. The sintered disks were then heated in a microwave oven at 700 watts but this time having a 500 gram water load simulating a food article being heated. The results of such testing are given in FIG. 15. The results of such testing are similar in nature to the results from FIG. 13; namely, that the final operating temperature and rate can be controlled by the sintering operation. If lower microwave heating temperatures are desired, the sintering operation is continued at more severe conditions of higher temperature and longer times. Moreover, FIG. 14 shows that if sintering is continued to densifications beyond those of the present invention, even highly desirable microwave ceramic compositions containing both silicon carbide as a primary microwave absorbing component, as well as supplemental microwave absorbing components will undesirably densify and result in a ceramic exhibiting minimal microwave absorption characteristics. (See the sample having been sintered at 1700° F. for 30 minutes).

Figure 16:
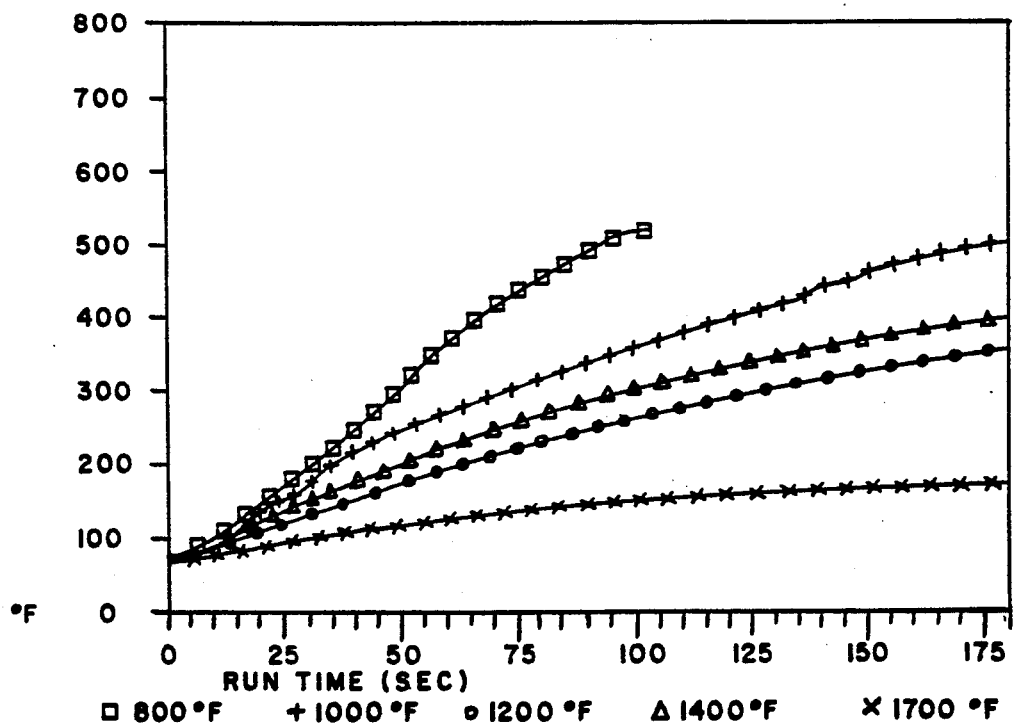

Still another test compared sintering the above composition for 10 minutes at different temperatures. The sample disks so prepared were then heated in a microwave oven at 700 watts with a 500 gram water load simulating a foodstuff. The results of such testing are depicted in FIG. 16. The temperature profiles depicted in FIG. 16 similarly support the conclusion that the sintering step can be selected so as to impart the desired controlled temperature profile/microwave heating characteristics desired. However, excessive sintering (e.g., >10 minutes at 1700° F.) can result in a fired ceramic excessively densified and exhibiting unacceptably excessive losses in microwave absorption/heating performance.

What is claimed is:

1. In a ceramic composition capable of absorbing microwave energy comprising a ceramic binder and a ceramic susceptor material which absorbs microwave energy, the improvement wherein said composition is sintered and said sintered composition comprises a microwave susceptor material that is a compound selected from a carbide, nitride, boride and mixture thereof, and
wherein the composition is sintered at 800° F. for a time sufficient to increase the density of the composition to about 50% of the theoretical density but below the vitrification density.

2. The composition as defined in claim 1 wherein said temperature is about 1200° to 1500° F.

3. The composition as defined in claim 2 wherein said density is about 50% to 90% of the density the composition may theoretically attain.

4. The composition as defined in claim 1 wherein said microwave susceptor material is a compound selected from the group consisting of silicon carbide, titanium carbide, zirconium carbide, hafnium carbide, vanadium carbide, tantalum carbide, molybdenum carbide, niobium carbide, graphite, silicon boride, silicon nitride, zirconium boride, zirconium nitride, calcium boride and mixtures thereof.

5. The composition as defined in claim 4 wherein said microwave susceptor material comprises about 15% to 98% of said ceramic composition and said binder comprises about 2% to 85% of said composition.

6. The composition as defined in claim 5 wherein said binder is selected from the group consisting of a clay, talc, mica, and mixtures thereof.

7. The ceramic composition as defined in claim 6 wherein said binder is selected from the group consisting of hectorite, vermiculite and mixtures thereof.

8. The ceramic composition as defined in claim 4 wherein said material which absorbs microwave energy is silicon carbide and said binder is hectorite.

9. The ceramic composition as defined in claim 1 wherein said material which absorbs microwave energy is silicon carbide in an amount of about 20% to 80% by weight and said binder is hectorite.

10. The composition as defined in claim 9 wherein said composition further comprises vermiculite.

11. The ceramic composition as defined in claim 10 wherein said composition comprises about 20% by weight silicon carbide, about 20% by weight vermiculite and about 60% by weight hectorite.

12. The ceramic composition as defined in claim 10 wherein said composition further comprises mica.

13. The ceramic composition as defined in claim 12 wherein said composition comprises by weight about 20% silicon carbide, about 20% vermiculite, about 10% mica and about 50% hectorite.

14. An article for use as a microwave susceptor in a microwave radiation field which article will absorb microwave radiation to produce heat and to raise the temperature of the article comprising a microwave absorptive body, said body fabricated from a microwave absorbing composition ceramic composition comprising:
A. a ceramic binder, and
B. a microwave susceptor material that is a compound selected from a carbide, nitride, boride and mixtures thereof, and
wherein the ceramic composition is sintered.

15. The article of claim 14 wherein the microwave susceptor material is a compound selected from the group consisting of silicon carbide, titanium carbide, zirconium carbide, hafnium carbide, vanadium carbide, tantalum carbide, molybdenum carbide, niobium carbide, graphite, silicon boride, silicon nitride, boron nitride, titanium boride, titanium nitride, zirconium boride, zirconium nitride, calcium boride and mixtures thereof, and
wherein the composition is sintered at 800° F. for a time sufficient to increase the density of the composition to above 50% of the theoretical density but below the vitrification density.

16. The article of claim 15 wherein said binder is selected from the group consisting of hectorite, vermiculite and mixtures thereof.

17. The article of claim 16 wherein said material which absorbs microwave energy is silicon carbide in an amount of about 20% to 80% by weight and said binder is hectorite.

18. The article of claim 17 wherein said composition comprises by weight about 20% silicon carbide, about 20% by weight vermiculite and about 60% by weight hectorite.

19. The article of claim 18 wherein said composition comprises by weight about 20% silicon carbide, about 20% vermiculite, about 10% mica and about 50% hectorite.

20. The article of claim 14 wherein said body is in sheet form.

21. The article of claim 15 wherein said sheet has a thickness of about 0.4 to 8 mm.

22. The article of claim 14 wherein said body is in the form of a tray.

23. The article of claim 17 wherein said article includes a cover for said tray of the same composition as said tray.

24. A package article for food to be heated by microwave energy in a microwave oven comprising a container for holding a food item and a microwave heating susceptor disposed within said container for intimate physical contact with said food item, said microwave heating susceptor fabricated from a ceramic composition, comprising:
A. a ceramic binder, and
B. a microwave susceptor material that is a compound selected from a carbide, nitride, boride and mixtures thereof, and
wherein the ceramic composition is sintered.

25. The article of claim 24 wherein said material which absorbs microwave energy is a compound selected from the group consisting of silicon carbide, titanium carbide, zirconium carbide, hafnium carbide, vanadium carbide, tantalum carbide, molybdenum carbide, niobium carbide, graphite, silicon boride, silicon nitride, boron nitride, titanium boride, titanium nitride, zirconium boride, zirconium nitride, calcium boride and mixtures thereof, and wherein the composition is sintered at 800° F. for a time sufficient to increase the density of the composition to above 50% of the theoretical density but below the vitrification density.

26. The article of claim 25 wherein said binder is selected from the group consisting of hectorite, vermiculite and mixtures thereof.

27. The article of claim 26 wherein said material which absorbs microwave energy is silicon carbide in an amount of about 20% to 80% by weight and said binder is hectorite.

28. The article of claim 26 wherein said composition comprises about 20% by weight silicon carbide, about 20% by weight vermiculite and about 60% by weight hectorite.

29. The article of claim 25 wherein said composition comprises by weight about 20% silicon carbide, about 20% vermiculite, about 10% mica and about 50% hectorite.

* * * * *

UNITED STATES PATENT AND TRADEMARK OFFICE
CERTIFICATE OF CORRECTION

PATENT NO. : 5,194,408

DATED : Mar. 16, 1993

INVENTOR(S) : Jeffrey A. Stamp, Jeffrey D. Meister

It is certified that error appears in the above-identified patent and that said Letters Patent are hereby corrected as shown below:

Abstract          - "800°C" should be -- 800°F --

Col. 2, Line 18   - Remove ":" between as and having.

Col. 3, Line 66   - Insert -- ( -- before described.

Col. 4, Line 31   - Insert -- elements for consumer or industrial appliances can vary -- between heating and widely.

Col. 6, Line 34   - Insert -- than as a microwave active material. It is recognized,-- between rather and however.

Col. 10, Line 10  - Insert -- major surface or top wall 24, a lower major surface or -- after upper.

Col. 10, Lines 12 & 13 - Delete "major surface or top wall 24, a lower major surface or".

Col. 11, Line 15  - Insert -- especially useful for batter food items like brownies in -- between are and which.

Col. 11, Lines 16 & 17 - Delete "especially useful for batter food items like brownies in".

Col. 11, Line 36  - Insert -- ) -- after material.

Col. 12, Line 61  - Insert -- resulting from sintering the present compositions is not -- between diminution and aggravated.

Col. 15, Line 39  - Insert -- boron nitride, titanium boride, titanium nitride, -- after silicon nitride,

UNITED STATES PATENT AND TRADEMARK OFFICE
CERTIFICATE OF CORRECTION

PATENT NO.  : 5,194,408
DATED       : Mar. 16, 1993
INVENTOR(S) : Jeffrey A. Stamp, Jeffrey D. Meister It is certified that error appears in the above–identified patent and that said Letters Patent are hereby corrected as shown below:

Col. 15, Line 46 - Insert -- ceramic -- between the and composition.

Col. 16, Line 37 - "by weight about 20%" should be -- about 20% by weight --.

Col. 16, Line 43 - "The article of" should be -- An article as defined in --.

Col. 16, Line 45 - "The article of" should be -- An article as defined in --.

Col. 16, Line 47 - "The article of" should be -- An article as defined in --.

Col. 16, Line 49 - "The article of" should be -- An article as defined in --.

Col. 16, Line 68 - "tantalium" should be -- tantalum --.

Signed and Sealed this

Twenty-eighth Day of December, 1993

Attest:

BRUCE LEHMAN

Attesting Officer    Commissioner of Patents and Trademarks